United States Patent
Li et al.

(10) Patent No.: US 11,958,197 B2
(45) Date of Patent: Apr. 16, 2024

(54) VISUAL NAVIGATION INSPECTION AND OBSTACLE AVOIDANCE METHOD FOR LINE INSPECTION ROBOT

(71) Applicant: Guangdong Keystar Intelligence Robot Co., Ltd., Foshan (CN)

(72) Inventors: Fang Li, Foshan (CN); Shaochun Jia, Foshan (CN); Guangmian Fan, Foshan (CN); Jiaju Xue, Foshan (CN); Jixian Wu, Foshan (CN); Fan Yang, Foshan (CN)

(73) Assignee: Guangdong Keystar Intelligence Robot Co., Ltd., Foshan (CN)

( * ) Notice: Subject to any disclaimer, the term of this patent is extended or adjusted under 35 U.S.C. 154(b) by 411 days.

(21) Appl. No.: 17/432,131

(22) PCT Filed: Mar. 26, 2020

(86) PCT No.: PCT/CN2020/081422
§ 371 (c)(1),
(2) Date: Oct. 14, 2021

(87) PCT Pub. No.: WO2021/114508
PCT Pub. Date: Jun. 17, 2021

(65) Prior Publication Data
US 2022/0152829 A1   May 19, 2022

(30) Foreign Application Priority Data
Dec. 9, 2019  (CN) .......................... 201911247121.5

(51) Int. Cl.
*B25J 9/16* (2006.01)
*B25J 19/02* (2006.01)
(Continued)

(52) U.S. Cl.
CPC ........... *B25J 9/1666* (2013.01); *B25J 9/1676* (2013.01); *B25J 9/1697* (2013.01); *B25J 19/023* (2013.01);
(Continued)

(58) Field of Classification Search
CPC ...... B25J 9/1666; B25J 9/1676; B25J 9/1697; B25J 19/023; G06T 5/70; G06T 7/0004;
(Continued)

(56) References Cited

U.S. PATENT DOCUMENTS

2020/0238504 A1* 7/2020 Xu .......................... B25J 9/0009

OTHER PUBLICATIONS

Zhu, Y., "Design of Vision-based Obstacle Crossing of High-voltage Line Inspection Robot", IEEE (Year: 2016).*

* cited by examiner

*Primary Examiner* — Adam R Mott
*Assistant Examiner* — Sagar Kc
(74) *Attorney, Agent, or Firm* — Javalon Law, PC

(57) ABSTRACT

A visual navigation inspection and obstacle avoidance method for a line inspection robot is provided. The line inspection robot is provided with a motion control system, a visual navigation system and an inspection visual system; and the method comprises the following steps: (1) according to an inspection image, the inspection visual system determining and identifying the type of a tower for inspection; (2) the visual navigation system shooting a visual navigation image in real time to obtain the type of a target object; (3) coarse positioning; (4) accurate positioning; and (5) according to the type of the tower and the type of the target object, the visual navigation system sending a corresponding obstacle crossing strategy to the motion control system, such that the inspection robot completes obstacle crossing. The inspection and obstacle avoidance method is real-time and efficient.

8 Claims, 12 Drawing Sheets

(51) Int. Cl.
    *G06T 5/70*           (2024.01)
    *G06T 7/00*           (2017.01)
    *G06T 7/10*           (2017.01)
    *G06T 7/60*           (2017.01)
    *G06T 7/73*           (2017.01)
    *G06T 7/90*           (2017.01)

(52) U.S. Cl.
    CPC .............. *G06T 5/70* (2024.01); *G06T 7/0004* (2013.01); *G06T 7/10* (2017.01); *G06T 7/60* (2013.01); *G06T 7/73* (2017.01); *G06T 7/90* (2017.01); *G06T 2207/20064* (2013.01); *G06T 2207/30261* (2013.01)

(58) Field of Classification Search
    CPC .... G06T 7/10; G06T 7/60; G06T 7/73; G06T 7/90; G06T 2207/20064; G06T 2207/30261; G06V 10/443; G06V 10/48; G06V 10/758; G06V 20/10; G05D 1/0223; G05D 1/0246
    See application file for complete search history.

VISUAL NAVIGATION INSPECTION AND OBSTACLE AVOIDANCE METHOD FOR LINE INSPECTION ROBOT

TECHNICAL FIELD

The present disclosure relates to the field of line inspection robot technologies, and more particularly, to a visual navigation inspection and obstacle avoidance method for a line inspection robot.

BACKGROUND

Traditional methods for inspection of power transmission lines are mainly based on manual inspection, and are lower in inspection efficiency, higher in labor intensity, and severer in working environment because workers generally need to work in the field. Furthermore, some power transmission lines span across high mountains, dense forests, and large rivers, making the inspection more difficult. Utilization of helicopters for inspection is higher in inspection efficiency but is poorer in economic benefit, and is easy to overlook subtle damage to the power transmission lines. As a special robot configured to inspect high-voltage power transmission lines, a line inspection robot may replace manual inspection. By virtue of its advantages of higher inspection efficiency and better imaging effect, inspection based on the line inspection robot is an inevitable trend of the combination of development of robot technologies and transmission line inspection technologies.

In an inspection process, the robot often needs to get over obstacles such as insulators, vibration dampers, and wires in occurrence of strand loosing/warping. Due to emergence of the obstacles, it is needed to adjust a traveling speed and a traveling form of the line inspection robot. Existing inspection robots are only provided with visual inspection systems, which are difficult to implement a better obstacle crossing strategy while completing inspection tasks.

SUMMARY

An objective of the present disclosure is to provide a visual navigation inspection and obstacle avoidance method for a line inspection robot. This method is characterized by smooth inspection and obstacle avoidance.

To achieve this objective, the present disclosure adopts following technical solutions.

There is provided a visual navigation inspection and obstacle avoidance method for a line inspection robot. The line inspection robot is provided with a motion control system, a visual navigation system, and a visual inspection system. Both the motion control system and the visual navigation system establish a communication connection with the visual inspection system.

The method includes following steps.

(1) An inspection camera of the visual inspection system captures an inspection image in real time, determines and recognizes a type of a pole and tower according to the inspection image, carries out an inspection on a conductor between poles and towers and an accessory structure thereof, and carries out an inspection on an insulator string and metal fittings of the pole and tower.

(2) The visual navigation system photographs a visual navigation image in front of the line inspection robot in real time and preprocesses the image. Next, the visual navigation system extracts and recognizes a feature of a target object in the preprocessed image to obtain a type of the target object.

(3) After determining the type of the target object, the visual navigation system measures a distance between the target object and a body of the inspection robot by means of monocular vision distance measurement to achieve coarse positioning.

(4) The motion control system adjusts a travel speed of the line inspection robot according to a coarse positioning distance, to achieve accurate positioning of a collision detection at a safety speed.

(5) The visual navigation system transmits a corresponding obstacle crossing strategy to the motion control system according to the type of the pole and tower and the type of the target object, such that the line inspection robot completes obstacle crossing.

Further, in the Step (2), the step of preprocessing the image includes: performing gray processing, restoration processing, denoising processing, enhancement processing, segmentation processing and normalization processing on the captured image in sequence.

Further, in the Step (2), the step of extracting and recognizing a feature of a target object in the preprocessed image includes: decomposing a character image formed after the preprocessing by using wavelet transformation of a statistical method, extracting a feature vector reflecting character statistical and structural features, and extracting a target object matching the feature vector from a template library to obtain the type of the target object.

Further, when the target object in the preprocessed image does not match the target object in the template library, a detection is carried out by using a geometrical method to achieve obstacle determination.

Further, in the Step (1), when the visual inspection system detects, by object recognition, that the inspection robot enters an inspection region of the pole and tower, a inspection path planning for the insulator string and the metal fittings of the pole and tower is initiated to complete an inspection.

The inspection camera needs to be tracked and adjusted in real time during a walking process of the inspection robot, such that the inspection camera always focuses an inspection object in a center of the image.

Further, a method for tracking and adjusting the inspection camera in real time includes: sequentially performing image gray processing, image restoration, image denoising, image enhancement, inspection object detection, object contour extraction, contour geometric center detection and center offset calculation on the inspection image, and then adjusting an angle of the camera according to a center offset distance.

Further, in the Step (1), the pole and tower includes a straight-line pole and tower and a strain pole and tower. An angle formed between a conductor and an insulator of the straight-line pole and tower is approximately 90 degrees, an angle formed between a conductor and an insulator of the strain pole and tower is approximately 0 degree, and the type of the pole and tower is recognized by detecting a location of the conductor with respect to the insulator.

Further, in the Step (1), the visual inspection system recognizes the insulator string in the inspection image, and transmits the type of the insulator string recognized to the visual navigation system, and then the Step (3) is proceeded.

Beneficial effects of the present disclosure are as below. The line inspection robot in the present disclosure is concurrently provided with the visual navigation system and the visual inspection system, and information transfer can be achieved between the two systems. The visual inspection system is configured to perform regular inspections, and the visual navigation system is configured to obtain types of target objects on inspection lines in real time, then perform coarse positioning and perform accurate positioning in conjunction with the motion control system, and finally the inspection robot selects a suitable obstacle crossing strategy to complete the obstacle crossing. In the present disclosure, the inspection task and the obstacle crossing task are respectively recognized and processed by two visual systems, and thus this method for inspection and obstacle crossing is real-time and efficient.

DETAILED DESCRIPTION

The technical solutions of the present disclosure are further described below with reference to the accompanying drawings and embodiments.

The present disclosure provides a visual navigation inspection and obstacle avoidance method for a line inspection robot. The line inspection robot is provided with a motion control system, a visual navigation system, and a visual inspection system. Both the motion control system and the visual navigation system establish a communication connection with the visual inspection system.

The method includes following steps.

(1) An inspection camera of the visual inspection system captures an inspection image in real time, determines and recognizes a type of a pole and tower according to the inspection image, carries out an inspection on a conductor between poles and towers and an accessory structure thereof, and carries out an inspection on an insulator string and metal fittings of the pole and tower.

The pole and tower includes a straight-line pole and tower and a strain pole and tower. An angle formed between a conductor and an insulator of the straight-line pole and tower is approximately 90 degrees, an angle formed between a conductor and an insulator of the strain pole and tower is approximately 0 degree, and the type of the pole and tower is recognized by detecting a location of the conductor with respect to the insulator.

When the visual inspection system detects, by object recognition, that the inspection robot enters an inspection region of the pole and tower, a inspection path planning for the insulator string and the metal fittings of the pole and tower is initiated to complete an inspection. The inspection camera needs to be tracked and adjusted in real time during a walking process of the inspection robot, such that the inspection camera always focuses an inspection object in a center of the image.

Figure 1:
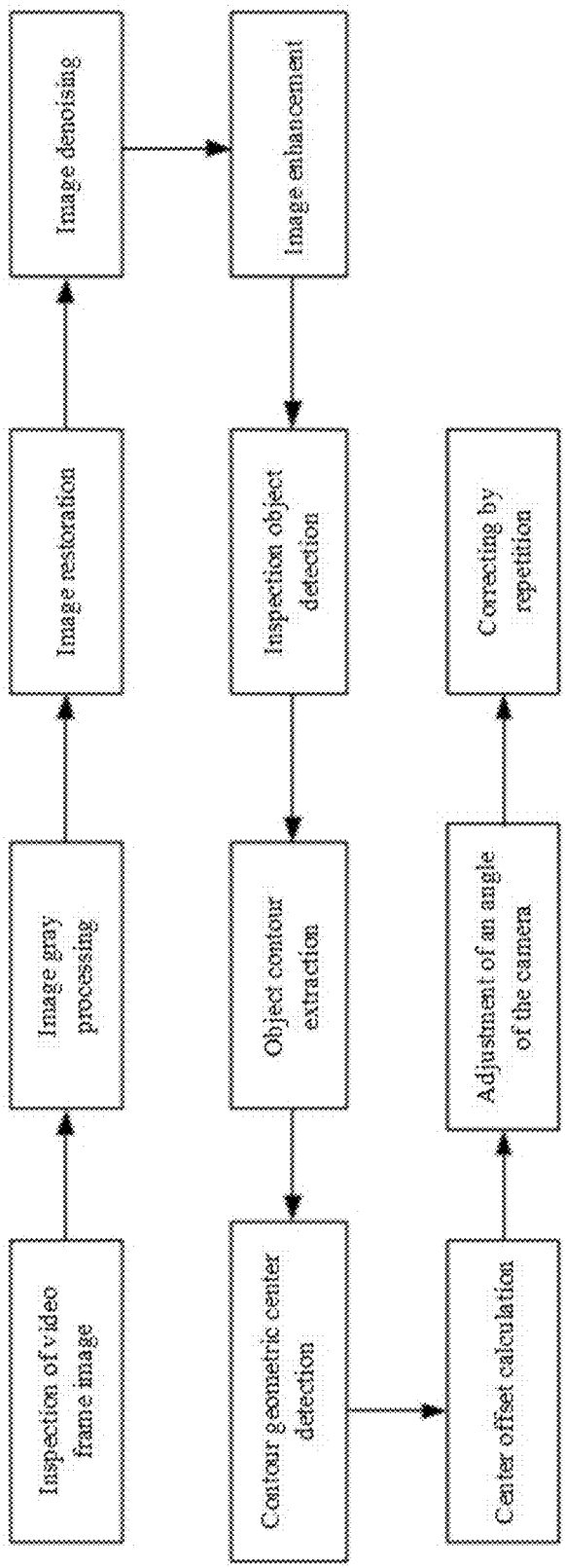
FIG. 1 is a schematic flow diagram of tracking and adjusting an inspection camera in real time according to the present disclosure.

As shown in FIG. 1, a method for tracking and adjusting the inspection camera in real time includes: sequentially performing image gray processing, image restoration, image denoising, image enhancement, inspection object detection, object contour extraction, contour geometric center detection and center offset calculation on the inspection image, and then adjusting an angle of the camera according to a center offset distance.

Figure 2:
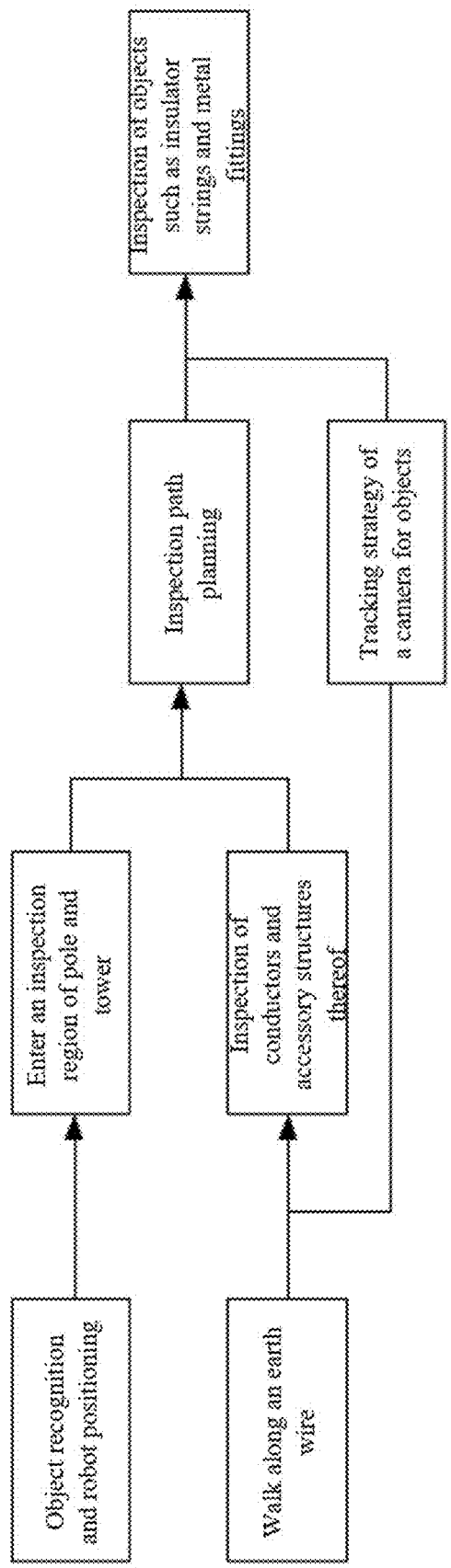
FIG. 2 is a schematic diagram of an inspection solution of a visual inspection system according to the present disclosure.

An inspection solution of the visual inspection system is as shown in FIG. 2. When the line inspection robot walks along an earth wire, conductors and accessory structures thereof are inspected. When the visual inspection system detects, by object recognition and robot positioning detection, that the inspection robot enters an inspection region of the pole and tower, an inspection path planning is initiated by recognizing the type of the pole and tower. Next, objects such as the insulator strings and the metal fittings are inspected according to a tracking strategy of the camera of the visual inspection system for the objects.

Further, in the Step (1), the visual inspection system recognizes the insulator string in the inspection image, and transmits the type of the insulator string recognized to the visual navigation system, and then the Step (3) is proceeded.

Figure 3:
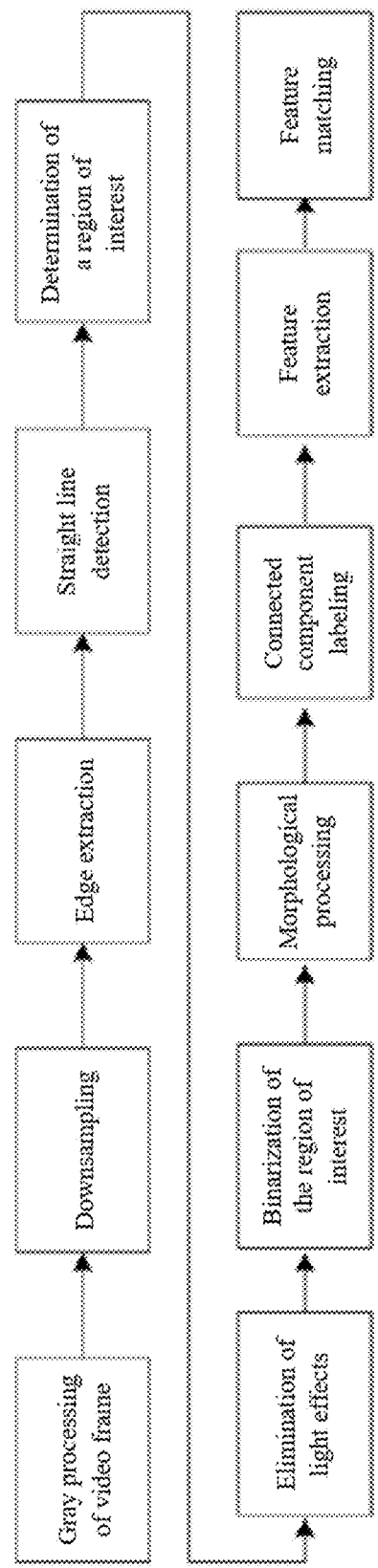
FIG. 3 is a flowchart of a recognition algorithm of an insulator according to the present disclosure.

In the present disclosure, the camera of the visual navigation system is fixed to an arm of the robot, and a visual navigation image presents scenes in a certain angle of view in front of the robot, and the insulator generally is outside a visual navigation angle of view. Therefore, recognition of the insulator is achieved by analyzing and recognizing an image by the visual inspection system of the robot. A recognition algorithm flow of the insulator is as shown in FIG. 3. The image of the visual inspection system is a video frame. First, the video frame is grayed, then the grayed video frame is processed by downsampling, edge extraction, straight line detection, determination of a region of interest, elimination of light effects, binarization of the region of interest, morphological processing, connected component labeling, and feature extraction in sequence, and finally extracted features are matched with features in the template library.

(2) The visual navigation system photographs a visual navigation image in front of the line inspection robot in real time and preprocesses the image. Next, the visual navigation system extracts and recognizes a feature of a target object in the preprocessed image to obtain a type of the target object.

The step of preprocessing the image includes: performing gray processing, restoration processing, denoising processing, enhancement processing, segmentation processing and normalization processing on the captured image in sequence. The step of extracting and recognizing a feature of a target object in the preprocessed image includes: decomposing a character image formed after the preprocessing by using wavelet transformation of a statistical method, extracting a feature vector reflecting character statistical and structural features, and extracting a target object matching the feature vector from a template library to obtain the type of the target object.

When the target object in the preprocessed image does not match the target object in the template library, a detection is carried out by using a geometrical method to achieve obstacle determination.

(3) After determining the type of the target object, the visual navigation system measures a distance between the target object and a body of the inspection robot by means of monocular vision distance measurement to achieve coarse positioning.

Principles of the monocular vision distance measurement are as below. A two-dimensional image is a projection of three-dimensional world on a two-dimensional image plane. During the projection process, depth information is lost, and the depth information cannot be obtained with only one image. To obtain the depth information, a known quantity is required. This is because the depth information cannot be obtained without the known quantity. In the algorithm, by measuring a distance between a point on a conductor of the image closest to the lens and the lens, the distance from the obstacle to the lens along the conductor may be obtained in conjunction with principles of pinhole imaging and a direct geometrical relationship between corresponding sizes of the robot.

Figure 5:
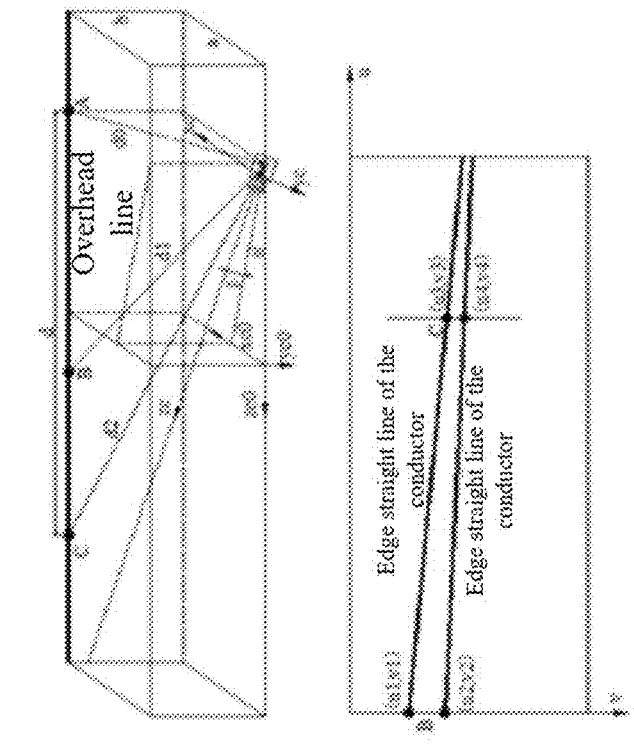
FIG. 5 illustrates a diagram of a monocular vision distance measurement model of a line inspection robot and an abbreviated drawing showing a geometrical relationship between a camera and a conductor.
Figure 5:
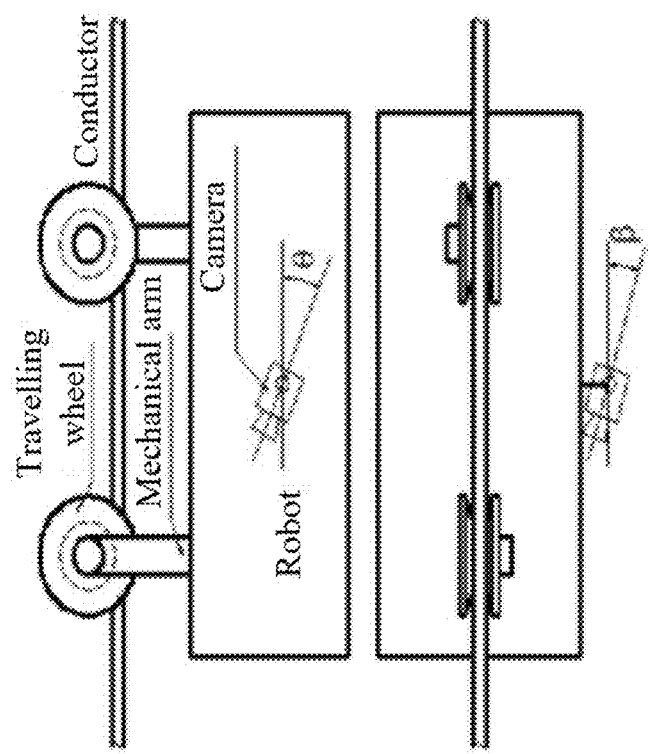
Figure 6:
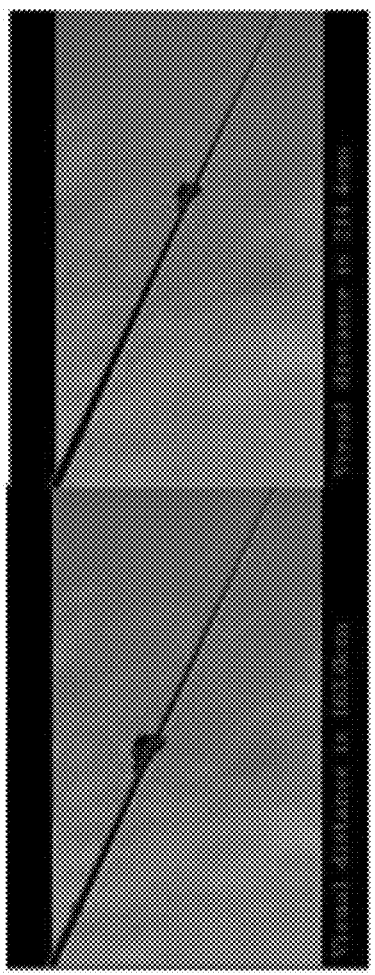
FIG. 6 illustrates a curve chart of visual distance measurement and an image frame.
Figure 6:
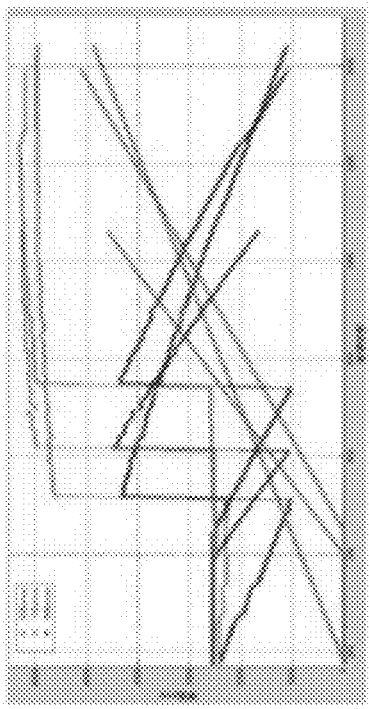

As shown in FIG. 5, the left picture in FIG. 5 is a monocular vision distance measurement model of the robot, and the right picture is a simplified diagram of the geometrical relationship between the camera and the conductor, wherein d1 represents a known distance, and d represents a distance to be measured. A pinhole imaging model has the following formula:

$$\begin{bmatrix} u \\ v \\ 1 \end{bmatrix} = \frac{1}{Z_c} \begin{bmatrix} f_x & 0 & u_0 & 0 \\ 0 & f_y & v_0 & 0 \\ 0 & 0 & 1 & 0 \end{bmatrix} \cdot \begin{bmatrix} X_c \\ Y_c \\ Z_c \\ 1 \end{bmatrix}$$

(u,v) represents coordinates of a pixel in the image, [Xc, Yc, Zc] represents three-dimensional coordinates of a point in a camera coordinate system. Based on the above formula, following formulas may be obtained:

$$v = \frac{f}{d_y} \cdot \frac{Y_c}{Z_c} + v_0 = f_y \frac{Y_c}{Z_c} + v_0 \Rightarrow$$

$$v_2 - v_1 = f_y \left( \frac{Y_{c2}}{Z_{c2}} - \frac{Y_{c1}}{Z_{c1}} \right) \approx f_y \cdot \frac{Y_{c2} - Y_{c1}}{Z_{c1}} = f_y \cdot \frac{Y_{c2} - Y_{c1}}{d_{c1} \cos \varphi_1}$$

wherein $v_1$ and $v_2$ represent differences of ordinates of edge lines on two sides of the conductor at B. Since Zc>>Xc, and Zc>>Yc, the following formula may be obtained:

$$d_{c1} = d_1 + f = f_y \cdot \frac{Y_{c2} - Y_{c1}}{v_2 - v_1} \cdot \frac{1}{\cos \varphi_1} \approx f_y \cdot \frac{Y_{c2} - Y_{c1}}{v_2 - v_1}$$

wherein $d_{c1}$ is as shown in the above formula, and similarly at C where the obstacle is, there is the following formula:

$$d_2 + f = f_y \cdot \frac{Y_{c4} - Y_{c3}}{v_4 - v_3},$$

and thus the following formula may be obtained:

$$d_2 = k \cdot d_1 + (k-1)f$$

A distance $d_2$ is obtained, wherein $d_1$ may be measured in advance, and k represents a ratio of a difference between ordinates at two lines B to a difference between ordinates at the obstacle C in FIG. 5. The distance (i.e., the distance d between Point A and Point C as shown in FIG. 5) from the obstacle to the lens of the camera along the conductor may be obtained based on the distance $d_2$ from the obstacle to the lens and the size of the robot. That is, $d = \sqrt{d_2^2 - a^2 - b^2}$.

To verify validity of the algorithm, an experimental verification may be carried out as below. The robot moves forward at a speed v. A travel distance $s_R$ is obtained according to the speed and travel time, and the distance from the robot to the obstacle is represented by $s_V$ by visual distance measurement. The sum of the travel distance $s_R$ and the distance $s^V$ is a fixed value, that is, $$\begin{cases} s_V = s_0 - vt \\ s_R = vt \end{cases}$$

$s_R + s_V = s_0$. A revolution speed of the robot is 500 r/min, 700 r/min, and 900 r/min, the camera shoots 25 frames per second, and the distance from the robot to the obstacle is measured every 5 frames, and this distance is plus the travel distance. Accurately detecting an edge straight line of the conductor in the algorithm is a key to distance measurement. The results are as shown in FIG. 5, where straight lines obliquely upward represent that the robot has traveled a distance $s_R$, which is calculated according to the travel speed, and the three lines correspond to three speeds. Obliquely downward curves represent a distance $s_V$ measured visually, i.e., the distance from the robot to the obstacle. Horizontal/vertical curves represent the sum $s_0$ of the distance $s_R$ and the distance $s_V$, which is a fixed value, i.e., a horizontal line. By marking on the conductor, actual values of the distance and visually measured values thereof are as shown in the table below.

| | 1 | 2 | 3 | 4 | 5 | 6 | 7 | 8 | 9 |
|---|---|---|---|---|---|---|---|---|---|
| Actual values (mm) | 500 | 1000 | 1500 | 2000 | 2500 | 3000 | 3500 | 4000 | 4500 |

-continued

| | 1 | 2 | 3 | 4 | 5 | 6 | 7 | 8 | 9 |
|---|---|---|---|---|---|---|---|---|---|
| Measured values (mm) | 517 | 991 | 1541 | 2070 | 2551 | 2892 | 3384 | 3863 | 4314 |
| Error | 3.4% | 0.9% | 2.7% | 3.5% | 2.0% | 3.6% | 3.2% | 4.1% | 4.2% |

(4) In the method of the present disclosure, the motion control system adjusts a travel speed of the line inspection robot according to a coarse positioning distance, to achieve accurate positioning of a collision detection at a safety speed.

(5) The visual navigation system transmits a corresponding obstacle crossing strategy to the motion control system according to the type of the pole and tower and the type of the target object, such that the line inspection robot completes obstacle crossing.

Figure 4:
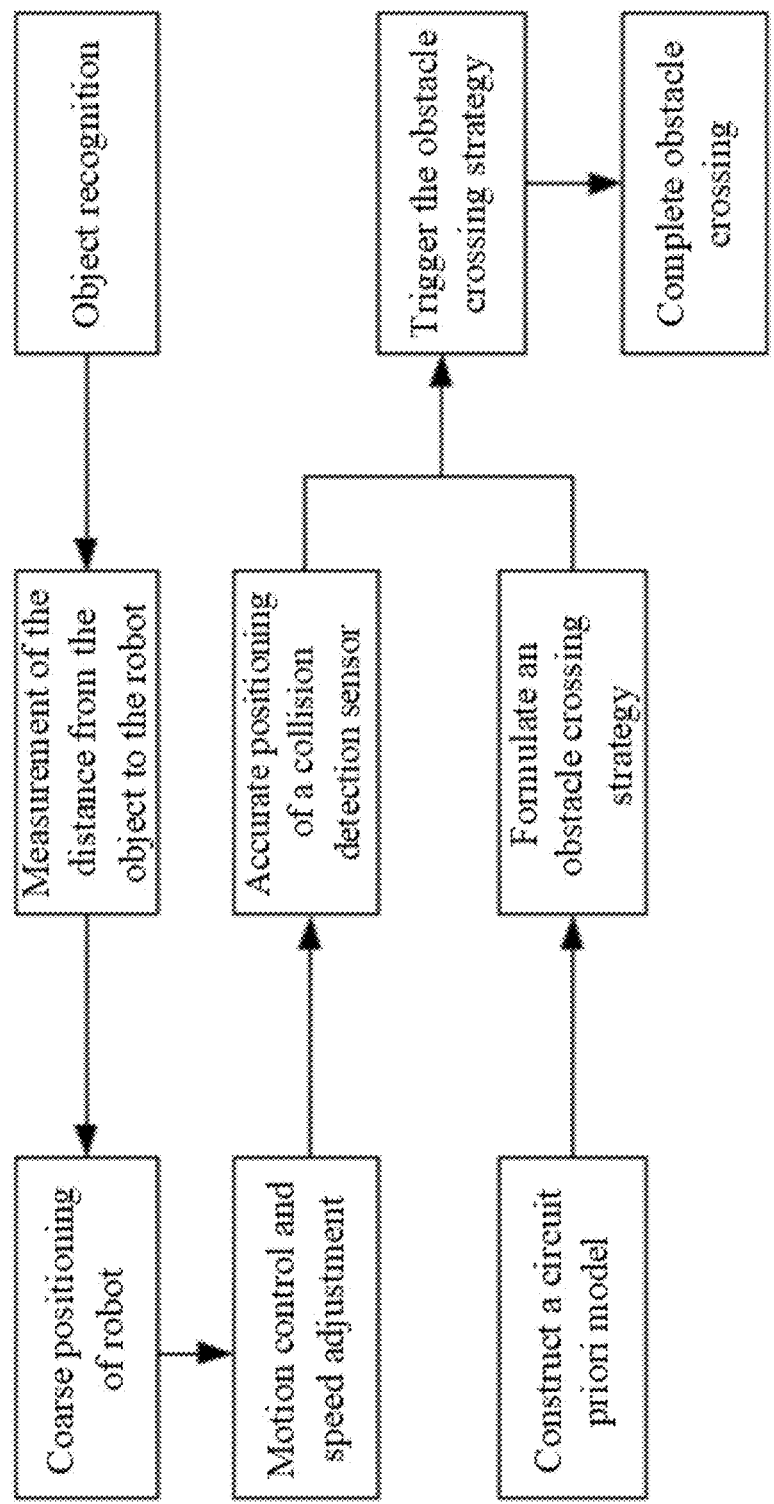
FIG. 4 is a schematic flow diagram of obstacle crossing for a visual navigation system in conjunction with a motion control system.

As shown in FIG. 4, the process of obstacle crossing for the visual navigation system in conjunction with the motion control system is as below. First, an object is recognized to determine the type of the target object. Next, the distance between the target object and a body of the inspection robot is measured (measurement of the distance from the object to the robot) to achieve coarse positioning of the inspection robot. Next, motion control and speed adjustment are performed on the inspection robot based on the coarse positioning, such that the inspection robot achieves accurate positioning of a collision detection at a safety speed to determine whether to trigger the obstacle crossing strategy designed according to a circuit priori model to completes the obstacle crossing, wherein this obstacle crossing strategy is formulated according to the circuit priori model.

Similar to the recognition process of the insulator, detection of the vibration dampers is taken as an example and is described in details as below.

1) Gray processing of a video frame: a color image is changed into a grayscale image. A video frame image shot by the camera is a color image, which contains three components of RGB. In the first step of processing, the color image is converted into the grayscale image. That is, a value of each point of the image is a grayscale between 0-255.

2) Downsampling: the image is downsampled to accelerate the speed of straight line detection, and a relationship between the downsampling and a HOUGH transform is as below:

$$x\cos\alpha + y\sin\alpha = \rho \Rightarrow \frac{x}{k}\cos\alpha + \frac{y}{k}\sin\alpha = \frac{\rho}{k}$$

The straight line $<\rho, \alpha>$ in the original image becomes $<\rho/k, \alpha>$ after downsampling at an interval of k, the angle remains unchanged, and the distance p becomes 1/k of the original distance. In this case, a point to be processed is $1/k^2$ of the original image, and processing time becomes $1/k^2$ of the original time. The sampling interval k used here is 2. A shrunk image with an area of only $1/k^2$ that of the original image is obtained by downsampling, and then a straight line $<\rho/k, \alpha>$ is obtained through the HOUGH transform, and then a straight line parameter $<\rho, \alpha>$ of the original image is obtained by multiplying $\rho/k$ by the sampling interval k.

3) Edge extraction: an edge of the image is obtained by using a CANNY algorithm, to facilitate subsequent extraction of straight lines. Accuracy of the edge extraction is directly related to the accuracy of the extraction of edge straight lines on two sides of the conductor, which has a great impact on the accuracy of the subsequent monocular vision distance measurement. A current algorithm with better effects is the CANNY algorithm.

4) Straight line extraction: edge straight lines on two sides of the conductor/earth wire may be obtained through the HOUGH algorithm. In the algorithm, the longest straight line detected is taken as the edge of the conductor. The straight line extraction serves as the basis for determination of a region of interest and the monocular vision distance measurement.

5) Determination of a region of interest: obstacles that hinder the robot's travel are near the conductor, and a region having a certain height on one side of the conductor (40 pixels in application) serves as the region of interest, and the obstacles are within the region of interest. In this way, processing range can be reduced, and processing speed can be increased.

6) Elimination of light effects: light effects are eliminated to ensure the integrity of an extracted target. A GAMMA correction algorithm is used.

7) Binarization of the region of interest: the target is converted into a binarized image to prepare for feature extraction. This process is expressed by a formula as below:

$$I(x, y) = \begin{cases} 0 & I_0(x, y) < T \\ 255 & I_0(x, y) \geq T \end{cases}$$

wherein T is determined by a more classical OTSU algorithm.

8) Morphological processing: the region of interest is processed using circular structural elements to fill small holes, smoothen edges, and eliminate burrs.

9) Connected component labeling: each target is segmented to facilitate subsequent extraction of features of each target. The connected component labeling refers to mark each connected target in the image as the same grayscale, such that each target is distinguished by different grayscales.

10) Feature extraction: features of each target are extracted, the first 4 components of a HU moment feature are used here, and the last three components are poor in stability. Based on a length-width ratio of the target and a ratio of the distance from a center of mass to the conductor to a length, these features may be expressed as: $X=[l/w, d/l, \varphi_1, \varphi_2, \varphi_3, \varphi_4]$ All these features are invariant to scale and direction. $l/w, \varphi_1, \varphi_2, \varphi_3, \varphi_4$ determines a shape of the target, and $d/l$ determines a position of the target with respect to the conductor. Meanings of these components are as below: l/w represents the length-width ratio of the vibration damper, d/l represents the ratio of the distance from the center of mass of the vibration damper to an edge line of the conductor to the length of the vibration damper, $\varphi_1, \varphi_2, \varphi_3, \varphi_4$ represent the first 4 components of the HU moment, which has seven components in total. In tests it is found that the last three components are smaller in value and larger in variation, and thus only the first 4 components are used.

Figure 7:
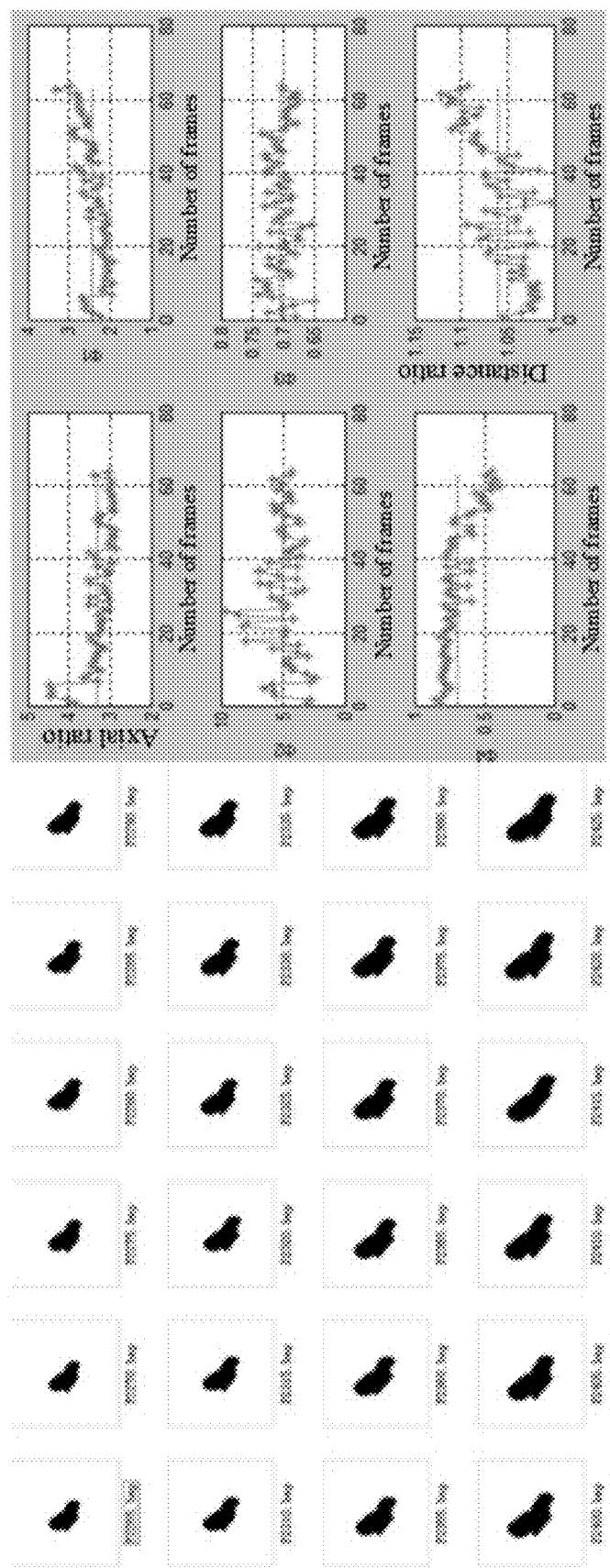
FIG. 7 is a template image chart for establishing a template library and a variation chart of components of a feature vector.
Figure 8:
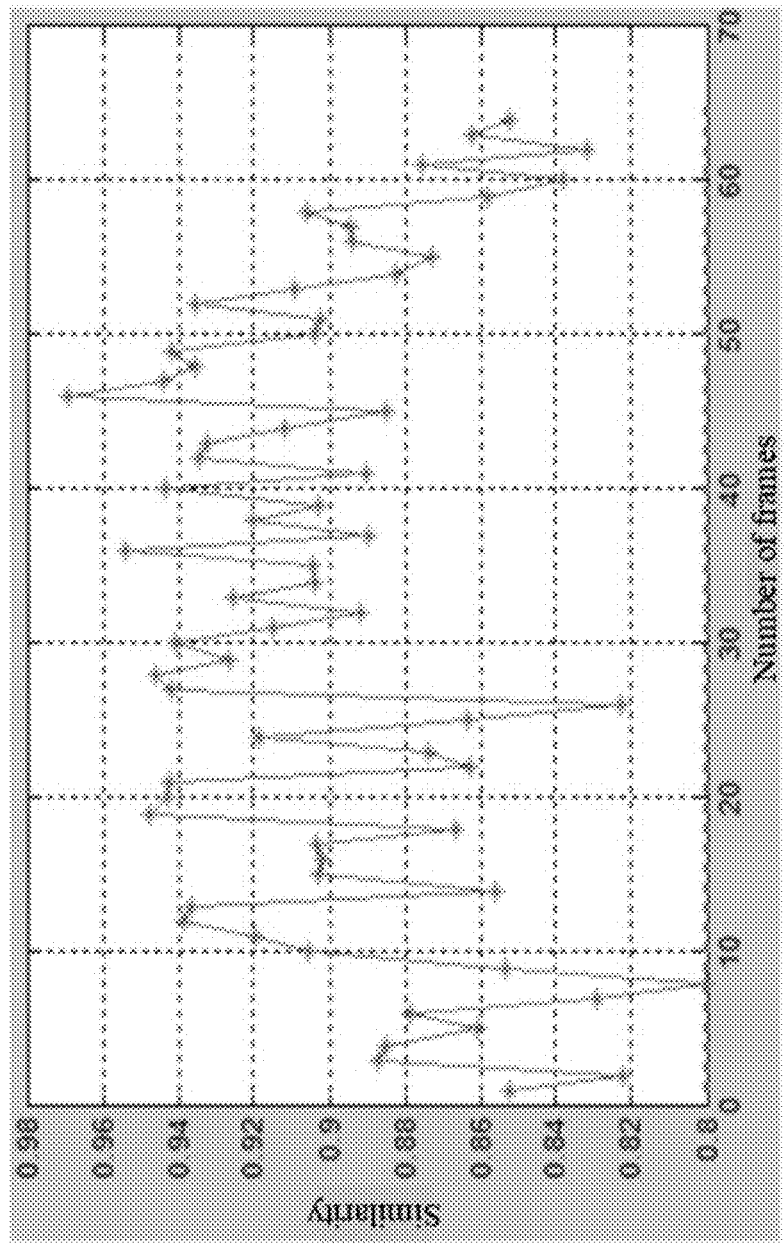
FIG. 8 is a diagram showing results of matching between a cylindrical vibration damper and a mean value feature vector Fm in a 64-frame image.

11) Establishment of a template library: the template library needs to be established in advance by using a template matching method. That is, features of a known obstacle are extracted and stored as a template (as shown in FIG. 7). Factors of the template need to be considered, for example, scale (image size) and various angular variations of the image under the same angle of view. Finally, a mean value of the feature values of the extracted images is taken, and the mean value is used as a feature vector of the obstacle (as shown in FIG. 8).

12) Feature matching: similarity between each target feature and a known template feature is compared. Supposing the target feature is $X=[x_1, x_2, x_3, \ldots x_N]$, and a feature of template i is $Mi=[m_1, m_2, m_3, \ldots m_N]$ (N=6. Both the target feature and the template adopt the feature vector as shown in the following formula. That is, the vector contains 6 components, and the similarity between the target and the template i is as below:

$$S_k = \frac{\sum_{i=1}^{N} \min(x_i)/\max(m_i)}{N}$$

It is calculated $d_k$(k=1,2,3 ... n), n represents the number of types of known obstacle templates, and the maximum value of $d_i$ is taken. If $d_k$=max(di)>T, wherein T represents a selected threshold, it is considered that the target to be measured belongs to the template k, and T is selected as 85% in the algorithm. That is, when a correlation between the target to be measured and the template Mi is 85%, it is considered that the target belongs to the template Mi.

Figure 9:
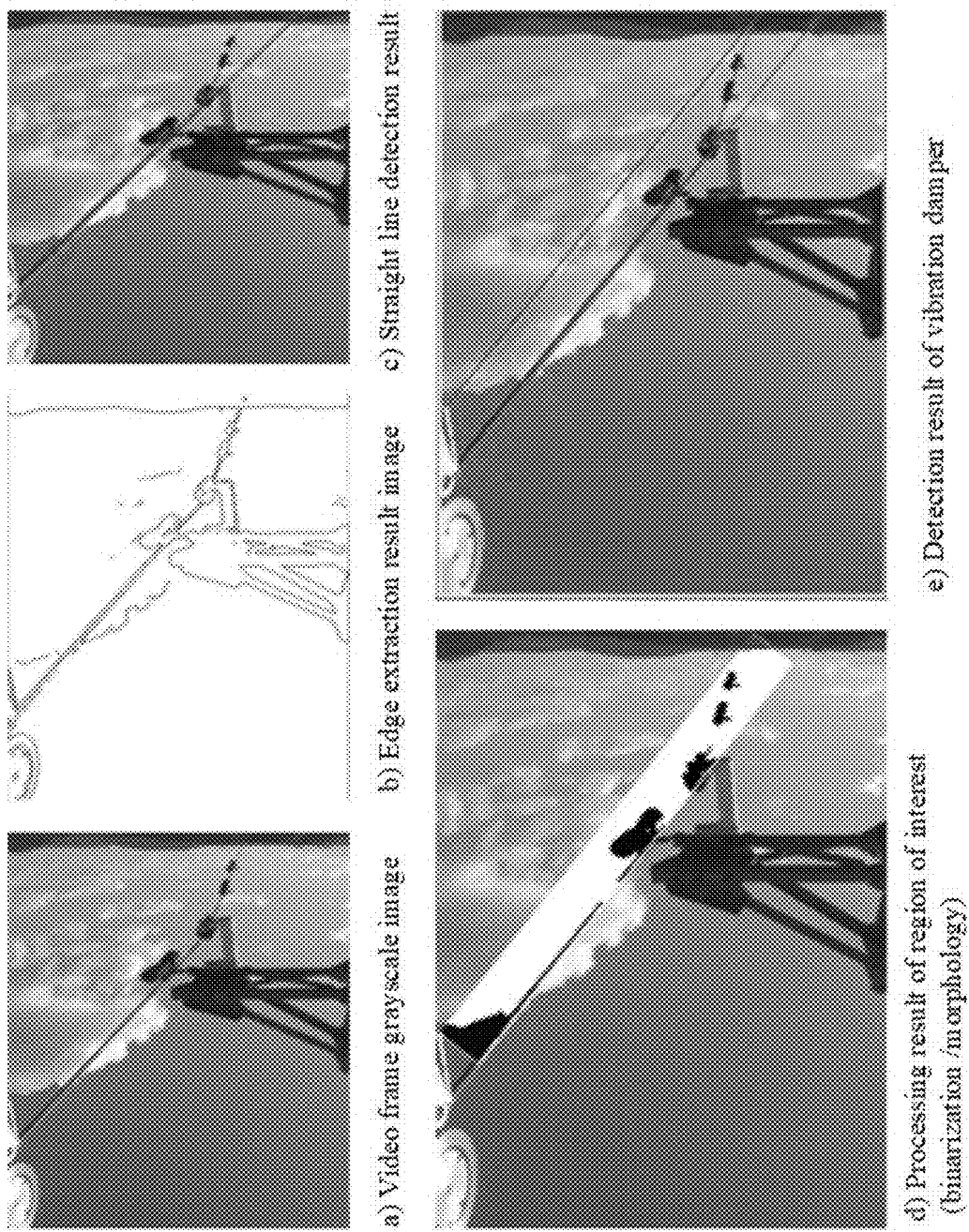
FIG. 9 illustrates detection images of the vibration damper in various detection stages.

After mean values of feature values are extracted from 64 images as a template, the similarity of the cylindrical vibration damper is recognized by using this template. As can be seen from the figure, the similarity is higher when the target is appropriate in position, and the similarity may be decreased no matter the target is farther or closer. When the target is far away, the target is too small to display enough features in the image. When the target is closer, the target is incomplete due to the light effects. The images at each stage of the detection are as shown in FIG. 9.

Figure 10:
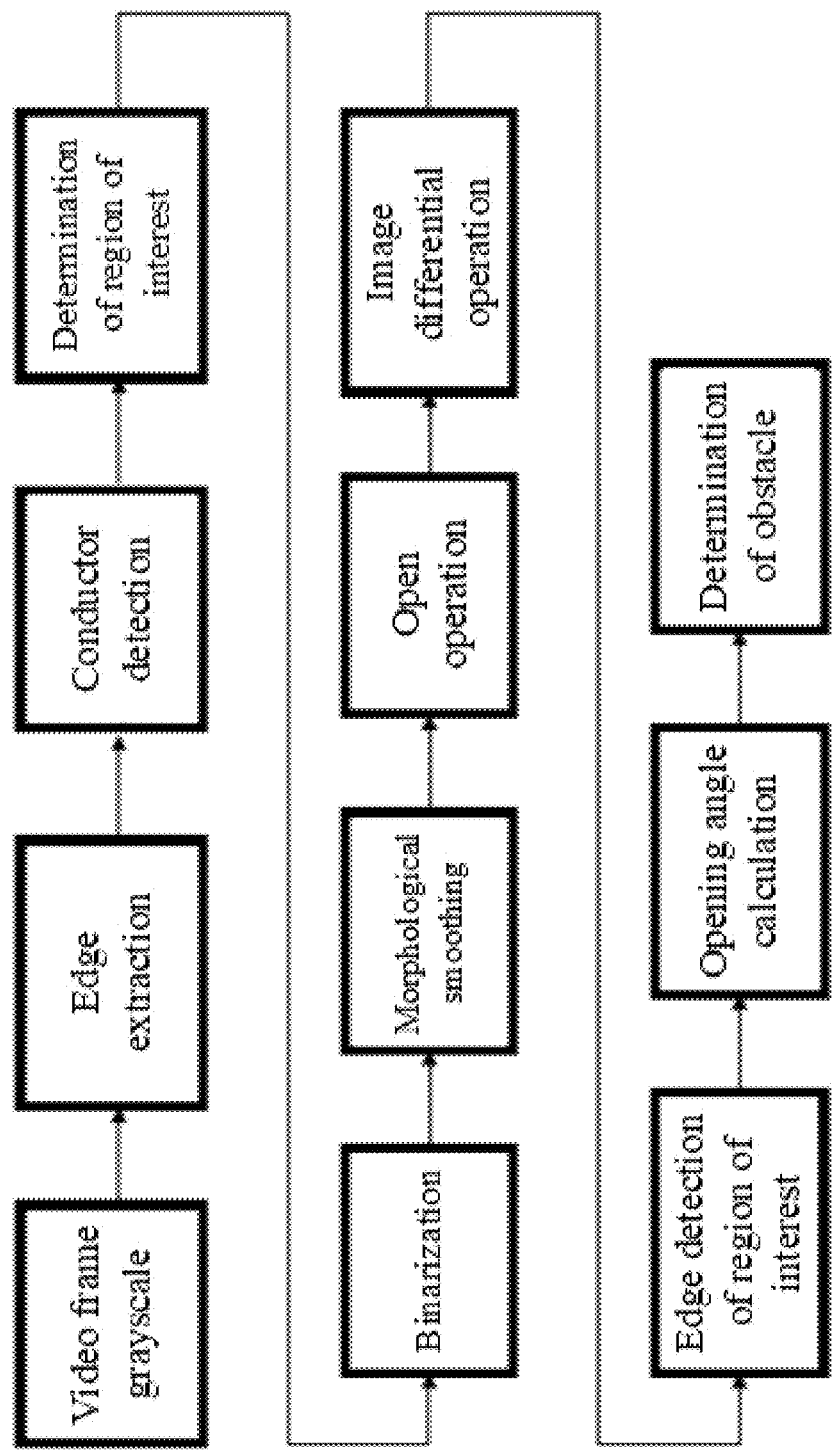
FIG. 10 illustrates a flowchart of detection of an obstacle using a geometrical method.

Taking strand loosing/warping as an example, a method for determining an obstacle using a geometrical method is as follows, and a detection process is as shown in FIG. 10. Steps are as follows.

Figure 11:
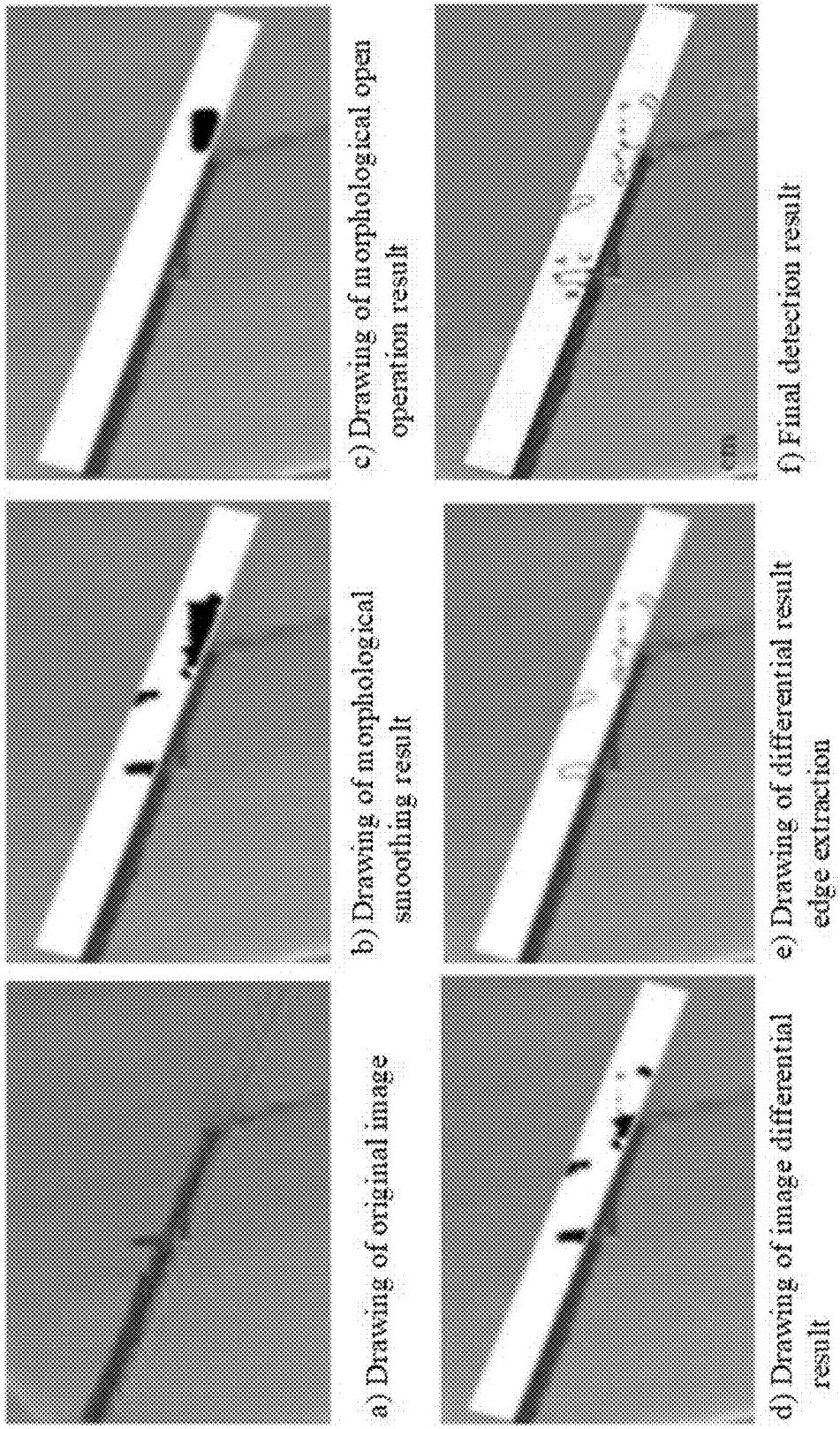
FIG. 11 illustrates open operation and image differential result diagrams.

1) A method for open operation and image differential is as below. The open operation is performed using a circular structural element whose diameter is equal to a thickest part of the conductor imaging, finer warped strands and loose strands are removed, and then a remaining part is obtained through the image differential. As shown in FIGS. 11(a-f), first the region of interest is processed by using morphological smoothing operation to reduce small noise points, and target regions are connected into a smooth whole body (as shown in FIG. 11(b)), and then a binary image is processed by the open operation, such that warped strands or loose strands are removed, with results in FIG. 11(c) left. At this moment, only a part of a larger target is left, and smaller targets are completely removed. Next, FIG. 11(d) is obtained by differentiating FIG. 11(b) and FIG. 11(c). After the edge extraction, complete smaller targets as shown in FIG. 11(e) are obtained, with warped strands and loose strands included. Furthermore, there are incomplete larger targets, and the larger targets may be removed by detecting initial areas of the targets and areas of the processed targets. Next, the warped strands and the loose strands (as shown in FIG. 11(e)) are determined from remaining smaller targets based on geometrical features.

2) Opening angle detection: it is calculated an opening angle between two points closest to the conductor and one point farthest from the conductor in an edge image of each connected component, and it is determined whether the targets are the warped strands or the loose strands according to the opening angle. The targets are the warped strands if the opening angle is less than a threshold, and the targets are the loose strands if the opening angle is greater than the threshold. The opening angle is calculated by the formula as below:

$$\cos A = \frac{b^2 + c^2 - a^2}{2bc}$$

Figure 12:
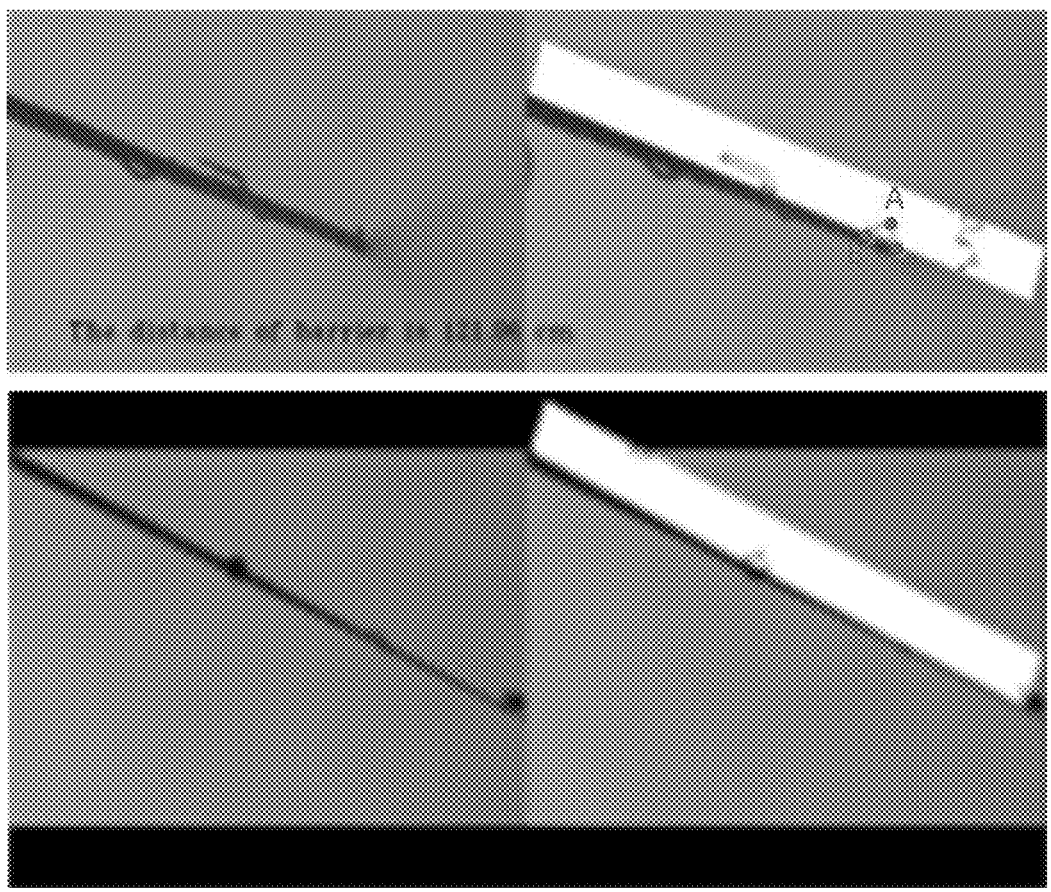
FIG. 12 illustrates warping detection result diagrams.

In a triangle formed by connecting lines between three points A, B and C in an opening angle calculation chart geometrical model, the opening angle formed by the point A is calculated. The two points B and C are two points closest to the conductor on a target contour and farthest from each other. The point A is a point having a maximum product of a distance from the point A to the point B and a distance from the point A to the point C on the target contour. FIG. 12 illustrates warping detection result diagrams, where the upper two pictures show one group of detection results, and the lower two pictures show another group of detection results, and the opening angle in the detection picture is 4.2°.

Technical principles of the present disclosure have been described above with reference to some embodiments. These descriptions are only for explaining the principles of the present disclosure, and cannot be construed as limiting the protection scope of the present disclosure in any way. Based on the explanation here, other embodiments of the present disclosure are conceivable to those skilled in the art without creative labor, and these embodiments will fall within the protection scope of the present disclosure.

What is claimed is:

1. A visual navigation inspection and obstacle avoidance method for a line inspection robot, the line inspection robot being provided with a motion control system, a visual navigation system, and a visual inspection system, wherein both the motion control system and the visual navigation system establish a communication connection with the visual inspection system;

the method comprising:

Step (1) capturing an inspection image in real time by an inspection camera of the visual inspection system, determining and recognizing a type of a pole and tower according to the inspection image, carrying out an inspection on conductors between the poles and towers and an accessory structure thereof, and carrying out an inspection on an insulator string and metal fittings of the pole and tower;

Step (2) photographing a visual navigation image in front of the line inspection robot in real time and preprocessing the visual navigation image by the visual navigation system;

extracting and recognizing a feature of a target object in the preprocessed visual navigation image to obtain a type of the target object;

Step (3) measuring, by the visual navigation system, a distance between the target object and a body of the line inspection robot by means of monocular vision distance measurement after determining the type of the target object to achieve coarse positioning;

Step (4) adjusting, by the motion control system, a travel speed of the line inspection robot according to a coarse positioning distance, to achieve accurate positioning of a collision detection at a safety speed; and Step (5) transmitting, by the visual navigation system, a corresponding obstacle crossing strategy to the motion control system according to the type of the pole and tower and the type of the target object, such that the line inspection robot completes obstacle crossing.

2. The visual navigation inspection and obstacle avoidance method for a line inspection robot according to claim 1, wherein in the Step (2), preprocessing visual navigation image comprises: performing gray processing, restoration processing, denoising processing, enhancement processing, segmentation processing and normalization processing on the visual navigation image in sequence.

3. The visual navigation inspection and obstacle avoidance method for a line inspection robot according to claim 1, wherein in the Step (2), the extracting and recognizing a feature of a target object in the preprocessed visual navigation image comprises: decomposing a character image formed after the preprocessing by using wavelet transformation of a statistical method, extracting a feature vector reflecting character statistical and structural features, and extracting a target object matching the feature vector from a template library to obtain the type of the target object.

4. The visual navigation inspection and obstacle avoidance method for a line inspection robot according to claim 3, wherein when the target object in the preprocessed visual navigation image does not match the target object in the template library, a detection is carried out by using a geometrical method to achieve obstacle determination.

5. The visual navigation inspection and obstacle avoidance method for a line inspection robot according to claim 1, wherein in the Step (1), when the visual inspection system detects, by object recognition, that the line inspection robot enters an inspection region of the pole and tower, initiating an inspection path planning for the insulator string and the metal fittings of the pole and tower to complete an inspection; and wherein the inspection camera is configured to be tracked and adjusted in real time during a walking process of the line inspection robot, and configured to focus an inspection object in a center of the inspection image.

6. The visual navigation inspection and obstacle avoidance method for a line inspection robot according to claim 5, wherein in the Step (2), wherein a method for tracking and adjusting the inspection camera in real time comprises: sequentially performing image gray processing, image restoration, image denoising, image enhancement, inspection object detection, object contour extraction, contour geometric center detection and center offset calculation on the inspection image, and then adjusting an angle of the inspection camera according to a center offset distance.

7. The visual navigation inspection and obstacle avoidance method for a line inspection robot according to claim 1, wherein in the Step (1), the poles and towers comprises a straight-line pole and tower and a strain pole and tower, an angle formed between a conductor and an insulator of the straight-line pole and tower is approximately 90 degrees, an angle formed between a conductor and an insulator of the strain pole and tower is approximately 0 degree, and the type of the pole and tower is recognized by detecting a location of the conductor with respect to the insulator.

8. The visual navigation inspection and obstacle avoidance method for a line inspection robot according to claim 1, wherein in the Step (1), the visual inspection system recognizes the insulator string in the inspection image, and transmits the type of the insulator string recognized to the visual navigation system, and the Step (3) is proceeded.

* * * * *